United States Patent [19]

Wachi et al.

[11] Patent Number: 4,645,799

[45] Date of Patent: Feb. 24, 1987

[54] CURABLE COMPOSITION OF ELASTOMERIC VINYLIDENE FLUORIDE COPOLYMER

[75] Inventors: Hiroshi Wachi, Ebina; Seitoku Kaya, Yokohama; Gen Kojima, Machida, all of Japan

[73] Assignee: Asahi Glass Company, Ltd., Tokyo, Japan

[21] Appl. No.: 788,579

[22] Filed: Oct. 17, 1985

[30] Foreign Application Priority Data

Oct. 18, 1984 [JP] Japan ................................ 59-217311

[51] Int. Cl.$^4$ ............................................. C08F 14/00
[52] U.S. Cl. ................................... 525/199; 525/308; 525/309; 525/313; 525/314; 525/326.2; 525/326.3; 525/340; 525/378; 525/379
[58] Field of Search ............... 525/340, 370, 379, 199, 525/308, 309, 313

[56] References Cited

U.S. PATENT DOCUMENTS

| | | | |
|---|---|---|---|
| 3,876,654 | 4/1975 | Pattison | 525/340 |
| 3,988,502 | 10/1976 | Patel et al. | 525/326.3 |
| 4,489,196 | 12/1984 | Schmiegel | 525/340 |
| 4,496,682 | 1/1985 | Schmiegel | 525/340 |

*Primary Examiner*—Joseph L. Schofer
*Assistant Examiner*—Bernard Lipman
*Attorney, Agent, or Firm*—Oblon, Fisher, Spivak, McClelland & Maier

[57] ABSTRACT

A curable composition comprising an elastomeric vinylidene fluoride copolymer, an organic peroxide and a vulcanization accelerator, characterized in that said copolymer contains unsaturated bonds introduced by reacting an untreated elastomeric vinylidene fluoride copolymer dispersed in an aqueous medium, with an aqueous alkaline solution containing an onium compound.

5 Claims, No Drawings

CURABLE COMPOSITION OF ELASTOMERIC VINYLIDENE FLUORIDE COPOLYMER

The present invention relates to a curable composition, and more particularly, to an elastomeric fluorine-containing copolymer composition having improved curability.

A combination of an organic peroxide and a suitable vulcanization accelerator has been realized to be useful for the curing of fluorine-containing elastomers. Various methods have been proposed for effectively reacting such curing systems. For instance, there may be mentioned a method in which a vinylidene fluoride-hexafluoropropylene copolymer is synthesized in the presence of a monomer or additive which contains bromine or iodine, so that reactive sites are introduced (Japanese Examined Patent Publications Nos. 4115/1978 and 1585/1979 and Japanese Unexamined Patent Publication No. 125491/1978), a method wherein a copolymer is subjected to heat-treatment at a high temperature to introduce unsaturated bonds (Japanese Examined Patent Publication No. 41641/1980, and Japanese Unexamined Patent Publication No. 86551/1976) or a method in which a copolymer is subjected to heat-treatment in the presence of a basic substance to introduce unsaturated bonds (Japanese Unexamined Patent Publication No. 122350/1979).

However, the bromine-containing monomer is not necessarily readily available, and in order to obtain a monomer suitable from the viewpoint of the reactivity, it is inevitable that the production costs increase. In the case of the iodine-containing compound, it is difficult to use it as a monomer, and it is known that such a compound is used as a kind of a chain length regulator during the polymerization. Therefore, it is difficult to incorporate the iodine-containing compound in a polymer chain in a highly concentrated state. Such an attempt is likely to lead to an increase of the production costs like the case of bromine. On the other hand, in the case of the heat-treatment at a high temperature, costs for the energy are substantial because of the treatment at a high temperature of at least 300° C. for a long period of time. Besides, there are a number of problems with respect to the efficiency, reproducibility and gelation. Moreover, the heat-treatment in the presence of a basic compound has many practical problems such that uniform dispersion is difficult, the treatment is cumbersome and the polymer is likely to undergo gelation.

On the other hand, with respect to a vinylidene fluoride homopolymer, it is known to convert it to a substituted poly(acetylene)-type polymer by reacting it with an aqueous alkaline solution containing an phase-transfer catalyst to dehydrofluorinate (J. Polymer Sci. Polym. Chem. Ed. 21, 3443-3451 (1983)). However, it is not known whether or not a similar reaction proceeds in the case of a vinylidene fluoride copolymer, and nothing is known about the conditions for the introduction of unsaturated bonds which are required and sufficient for curing sites for elastomers.

It is an object of the present invention to solve the above-mentioned problems inherent to the conventional techniques and to provide a composition which has excellent curability and is capable of presenting a vulcanized elastomer having excellent properties, and which is capable of being produced at low costs.

The present invention provides a curable composition comprising an elastomeric vinylidene fluoride copolymer, an organic peroxide and a vulcanization accelerator, characterized in that said copolymer contains unsaturated bonds introduced by reacting an untreated elastomeric vinylidene fluoride copolymer dispersed in an aqueous medium, with an aqueous alkaline solution containing an onium compound.

Now, the present invention will be described in detail with reference to the preferred embodiments.

In the present invention, the untreated elastomeric vinylidene fluoride copolymer may be a copolymer of vinylidene fluoride with at least one comonomer which is capable of forming an elastomeric copolymer when copolymerized with vinylidene fluoride. For instance, there may be mentioned copolymers of vinylidene fluoride with at least one comonomer selected from the group consisting of tetrafluoroethylene, chlorotrifluoroethylene, trifluoroethylene, vinyl fluoride, hexafluoropropylene, a perfluoro(alkylvinyl ether), a perfluoro(alkoxyalkylvinyl ether), ethylene, propylene, isobutylene and the like. More specifically, there may be mentioned a vinylidene fluoride-tetrafluoroethylene-propylene terpolymer, a vinylidene fluoride-tetrafluoroethylene-ethylene-isobutylene four-component copolymer, a vinylidene fluoride-hexafluoropropylene-tetrafluoroethylene terpolymer, a vinylidene fluoride-perfluoro (alkylvinyl ether) bipolymer, and a vinylidene fluoride-perfluoro(alkoxyalkylvinyl ether) bipolymer, and such copolymers to which other comonomer units are further incorporated. It is preferred to employ a copolymer having a glass transition temperature of not higher than room temperature.

The proportions of the respective monomer units in such copolymers are optionally selected taking into account various properties such as the mechanical properties, heat resistance, low temperature resistance, chemical resistance, oil resistance, etc. For instance, the vinylidene fluoride-tetrafluoroethylene-propylene terpolymer preferably comprises from 3 to 70 mol % of vinylidene fluoride units, from 20 to 60 mol % of tetrafluoroethylene units and from 20 to 50 mol % of propylene units. Likewise, the vinylidene fluoride-hexafluoropropylene copolymer, or the vinylidene fluoride-hexafluoropropylene-tetrafluoroethylene terpolymer may preferably comprise from 50 to 85 mol % of vinylidene fluoride units, from 15 to 30 mol % of hexafluoropropylene units and from 0 to 30 mol % of tetrafluoroethylene units.

Further, in such copolymers, the proportion of the vinylidene fluoride units is preferably from 2 to 90 mol %, more preferably from 5 to 85 mol %. If the proportion is too high, there will be drawbacks with respect to the physical properties, such as lack of elasticity or a decrease in the alkali resistance of the copolymer. On the other hand, if the proportion is too low, the formation of unsaturated bonds will be inadequate, and the effectiveness for the improvement of the curability deteriorates.

In the present invention, it is important that such a copolymer contains unsaturated bonds which have been introduced by reacting an untreated copolymer dispesed in an aqueous solution, with an aqueous alkaline solution containing an onium compound.

The method for dispersing the untreated elastomeric vinylidene fluoride copolymer in an aqueous medium is not critical. However, it is advantageous to employ a method wherein the copolymer is formed in an aqueous medium by means of e.g. emulsion polymerization or suspension polymerization, and the latex or aqueous dispersion thereby obtained is used as it is. Of course, it is also possible to use an aqueous dispersion prepared by dispersing a copolymer prepared by solution polymerization or bulk polymerization, by means of a suitable means. In any case, the average particle size of the copolymer dispersed in the aqueous medium is preferably at most 10 mm in order to conduct the reaction smoothly. Further, the aqueous dispersion may contain t-butanol or an organic solvent such as trichlorotrifluoroethane or dichlorotetrafluoroethane for the purpose of facilitating the reaction.

In the present invention, the onium compound is preferably the one which reacts with a nucleophilic agent and thus serves to promote the solubility in an organic medium by the action of the lipophilic cation, or to improve the affinity to an organic substance, and which has a function to facilitate the reaction of the nucleophilic agent with an organic substrate. For instance, there may be employed an ammonium compound with its cation center element being nitrogen and various other compounds such as a phosphonium compound, an arsonium compound, a sulfonium compound, an oxonium compound, a selenonium compound, a stannonium compound and an iodonium compound. A quaternary ammonium compound and a quaternary phosphonium compound are preferred from the viewpoint of the availability. As such a compound, a chloride, a bromide, an iodide, a hydroxide and a hydrosulfate are preferred. Among them, a compound having a well balanced hydrophilic and lipophilic nature is preferably employed from the viewpoint of the activity. As such a suitable compound, there may be mentioned tetrabutylammonium bromide, tetrabutylammonium chloride, benzyltributylammonium chloride, benzyltriethylammonium bromide, tetrabutylammonium hydrogen sulfate, tetrabutylammonium hydroxide, benzyltriethylammonium chloride, tetrabutylphosphonium bromide and tetrapropylphosphonium bromide. The amount of the onium compound is not critical. However, in order to have the dehydrofluorination reaction conducted smoothly, it is preferred to adjust the amount depending upon the proportion of the vinylidene fluoride units in the copolymer to be treated. When the proportion is represented by V (unit: mol %), the amount (parts by weight) of the onium compound is preferably selected within a range of from 20/V to 400/V, more preferably from 40/V to 200/V per 100 parts by weight of the untreated copolymer i.e. the copolymer to be treated.

In the present invention, as the alkali source of the aqueous alkaline solution containing the onium compound, an amine, ammonia, an alkali metal hydroxide, an alkaline earth metal hydroxide or the like is basically useful. However, from the viewpoints of the workload of the waste water treatment and the coagulating properties of the copolymer, it is preferred to employ sodium hydroxide or potassium hydroxide. The alkali concentration in the aqueous solution is usually from 0.5 to 40% by weight, preferably from 2 to 20% by weight.

In the present invention, it is preferred to take a due care not to cause gelation of the unreacted copolymer when the unreacted elastomeric vinylidene fluoride copolymer is reacted with the aqueous alkaline solution containing the onium compound, in view of the blending properties or curing properties thereby obtainable. Further, from the viewpoints of both the curing properties and the physical properties of the vulcanizate, the concentration of unsaturated bonds in the copolymer treated for the dehydrofluorination, is preferably from 0.1 to 15 per 100 units of the monomer, and this value is preferably at a level of from 0.5 to 10, particularly from 1 to 5. From such viewpoints, the temperature is preferably from 50° to 120° C., more preferably from 70° to 100° C., and the reaction time is preferably from 10 minutes to 10 hours, particularly from 30 minutes to 3 hours.

In the present invention, various peroxides may be employed as the organic peroxide. For instance, there may be mentioned monoperoxy compounds, for instance, a diacylperoxide such as dibenzoylperoxide, a peroxy ester such as dicumylperoxide, di-t-butylperoxide, t-butylperoxy acetate, t-butylperoxyisopropyl carbonate or t-butylperoxy benzoate, and diperoxy compounds such as 2,5-dimethyl-2,5-di(t-butylperoxy)-hexyne-3,2,5-dimethyl-2,5-di-(t-butylperoxy)-hexane, $\alpha,\alpha'$-bis(t-butylperoxy)-p-diisopropylbenzene or 2,5-dimethyl-2,5-di-(benzoylperoxy)-hexane. These peroxides may be used alone or in combination as a mixture of two or more different kinds. The amount of the organic peroxide is usually from 0.1 to 20 parts by weight, preferably from 1 to 10 parts by weight per 100 parts by weight of the elastomeric vinylidene fluoride copolymer.

In the present invention, as the vulcanization accelerator, there may be employed reactive unsaturated compounds, for instance, functional monomers such as allyl compounds, methacrylates or divinyl compounds, and polyfunctional polymers such as polybutadienes, as well as oxime compounds and sulfur compounds. From the viewpoints of curability and kneadability for blending, the reactive unsaturated compounds are preferred. Particularly, from the viewpoints of the physical properties of the vulcanizate such as the permanent set and heat resistance, polyfunctional compounds such as polyallyl compounds and 1,2-polybutadienes are preferably employed.

As the polyallyl compounds to be preferably used in the present invention, there may be mentioned various compounds having at least two allyl groups ($-CH_2CH=CH_2$). For instance, there may be mentioned an alkyl or aromatic amine substituted by polyallyl groups such as diallyl ether of glycerin, diallylamine or triallylamine; phosphoric or phosphorous acid substituted by polyallyl groups represented by e.g. triallylphosphoric acid; a polyallyl substituted carboxylic acid such as diallyl succinate, diallyl adipate or diallyl phthalate; diallyl melamine, triallyl cyanurate, or triallyl isocyanurate. These compounds may be used alone or in combination as a mixture of at least two different kinds. As suitable specific examples, there may be mentioned triallyl cyanurate (162° C./2 mmHg), triallyl phosphate (157° C./44 mmHg), triallyl isocyanurate, diallyl phthalate (161° C./4 mmHg) and diallyl melamine, which have a boiling point of at least 30° C. under reduced pressure of 2 mmHg.

Such a vulcanization accelerator is used usually in an amount of from 0.2 to 10 parts by weight per 100 parts by weight of the elastomeric vinylidene fluoride copolymer.

To the composition of the present invention, there may be incorporated various additives which are commonly used for the preparation of the conventional vulcanized elastomers. These additives include metal oxides such as magnesium oxide and lead oxide; reinforcing fillers such as carbon black, fine silica, clay and talc; other fillers; pigments; antioxidants; and stabilizers.

For the preparation of the composition of the present invention, it is desirable to sufficiently uniformly blend the elastomeric copolymer, the organic peroxide, the vulcanization accelerator and other additives. Such blending is conducted by a conventional means such as a rubber kneading roll or a Bumbury's mixer. The operation for the blending is not critical. Usually, the additives can adequately be dispersed in the elastomeric vinylidene fluoride copolymer by kneading the mixture at a temperature of from 30° to 80° C. for from about 10 to 60 minutes It is also possible to add the additives in a form of a suspension by dissolving and dispersing the additives in a suitable medium. It is also possible to employ a wet blending whereby the blending is conducted in a medium from the beginning. In such a case, a composition in the form of a suspension can be prepared by using a mixer such as an open roll, a ball mill or a homogenizer. It is desirable to select the optimum condition and operation for the blending process depending upon the particular purpose and upon the types of the starting materials and the additives.

The composition of the present invention can be fabricated into a shaped product such as a sheet, a pipe, a rod, a tube, an angle, a channel, a coated fabric and a coated board by a continuous fabrication process such as an extrusion, a transfer molding process, a roll-coating process, a brush-coating process or a dipping process. It is also possible to fabricate it into articles having complexed shapes or into special molded products such as sponge rubber by various molding and processing methods. The fabricated composition of the present invention is vulcanized by a suitable vulcanizing means whereby a vulcanized elastomer is obtained from the composition of the present invention. In the present invention, the vulcanization can be conducted by an operation which has been commonly employed in the conventional vulcanization. For instance, it is possible to employ an operation in which a shaped product is heated under pressure in a mold, or a method in which the composition is molded by extrusion, calender rolling or injection molding, and then the molded product is heated in a heating furnace or in a steamed oven. The conditions for the operation of the vulcanization are selected to be the optimum conditions for the starting materials or the blend composition. The temperature for the vulcanization is usually from 80° to 250° C., preferably from 120° to 200° C. The heating time is not critical, and it is usually selected within a range of from 1 minute to 3 hours, preferably from 5 minutes to 2 hours depending upon the type of the organic peroxide. The heating time can be shortened by increasing the heating temperature. Further, it is possible to conduct a post cure treatment of the vulcanizate thereby obtained, which often serves for an improvement of the physical properties. For instance, it is possible to conduct the post cure treatment at a temperature of from 150° to 250° C., preferably from 180° to 230° C., for from 2 to 25 hours.

Now, the present invention will be described in further detail with reference to Examples and Comparative Examples. However, it should be understood that the present invention is by no means restricted to these specific Examples. In the Examples and Comparative Examples, the curing properties of the compositions and the physical properties of the vulcanizates were measured as follows:

Curing properties

By using a Curelastometer (JSR II Model, manufactured by Imanaka Kikai Kogyo K.K.), a vulcanization curve was obtained at 170° C., and the effective torque $\Delta TR$ corresponding to the vulcanization density and the optimum curing time $t_{90}$ were calculated from the vulcanization curve.

Physical properties of vulcanizates

A curable composition was molded and vulcanized in a shape of a test piece having a thickness of 1 mm and the one for the measurement of permanent set, under a pressure of 100 kg/cm$^2$G at a temperature of 170° C. for 15 minutes, and then subjected to second curing at 230° C. for 16 hours to obtain a test piece, which was subjected to the measurement of various physical properties.

The tensile properties, low temperature resistance and chemical resistance were measured in accordance with JIS K-6301, and the permanent set was measured in accordance with ASTM D-395-78.

EXAMPLE 1

A latex containing 13.1% by weight of a terpolymer comprising vinylidene fluoride/tetrafluoroethylene/propylene in the molar ratio of 34.8/38.9/26.3 was prepared by emulsion polymerization.

On the other hand, into a 2 liter three-necked flask equipped with a condenser and a stirrer, 500 g of an aqueous solution containing 10% by weight of sodium hydroxide was charged and heated to 90° C. To this solution, 380 g of the latex obtained above was dropwise added under stirring, and the resulting copolymer was permitted to coagulate to obtain a dispersion of the copolymer. The dropping rate and the stirring rate were controlled to adjust the particle size of the coagulated particles to be at most 10 mm.

Then, 1.5 g of tetra-n-butylammonium bromide was added to the above dispersion, and the mixture was maintained at 90° C. for 3 hours. As the time passes, both the particle phase and the liquid phase colored brown.

After cooling the dispersion to room temperature, the particle phase was separated, washed and dried, whereby 49.6 g of the treated copolymer was obtained.

By the treatment, new absorption peaks were observed at 3130 cm$^{-1}$, at 1722 cm$^{-1}$ and at 1690 cm$^{-1}$ in the infrared spectrum, and thus the introduction of unsaturated bonds was confirmed.

40 g of the treated copolymer obtained above, 0.8 g of 2,5-dimethyl-2,5-di-(t-butylperoxy)-hexane, 2 g of triallylisocyanurate, 2 g of calcium hydroxide and 14 g of MT carbon were kneaded by a 4 inch roll mill to obtain a curable composition. The curing properties of the curable composition and the physical properties of the vulcanizate are shown in Table 1.

COMPARATIVE EXAMPLE 1

300 g of the same latex as in Example 1 was dropwise added to an aqueous sodium chloride solution, followed by coagulation, washing and drying, whereby 39.3 g of a white polymer was obtained.

The copolymer thus obtained was directly blended and kneaded in the same manner as in Example 1 to obtain a curable composition.

The curing properties of such a composition were as poor as $\Delta TR$ being only 0.9 kg-cm and $t_{90}$ being as long as 10.9 minutes, thus not suitable for practical application.

COMPARATIVE EXAMPLE 2

By using the same latex as in Example 1, the same alkali treatment was conducted except that tetra-n-butylammonium bromide was not added, whereby a brown granular polymer was obtained.

The copolymer thus obtained was blended and kneaded in the same manner as in Example 1 to obtain a curable composition. The composition exhibited fair curing properties with $\Delta TR$ being 3.2 kg-cm, but even after kneading, it was not completely soluble in a solvent such as tetrahydrofuran, and the Moony viscosity ML (100° C.) as an index for the moldability was as high as at least 200, thus unsuitable as the polymer starting material.

COMPARATIVE EXAMPLE 3

A latex containing 13.1% by weight of a four component copolymer comprising vinylidene fluoride/tetrafluoroethylene/propylene/perfluoro-(2-bromoethylvinyl ether) in a molar ratio of 40.1/34.8/23.2/1.9 and having a composition similar to the one used in Example 1 except that a small amount of perfluoro-(2-butylethyl vinyl ether) units are contained as curing sites, was prepared by emulsion polymerization.

The intrinsic viscosity of the four component copolymer separated from the above latex was 0.63 dl/g as measured in tetrahydrofuran.

This copolymer was directly blended and kneaded in the same manner as in Example 1 to obtain a curable composition. The curing properties of the composition and the physical properties of the vulcanizate are shown in Table 1.

EXAMPLE 2

The same operation as in Example 1 was conducted except that tetra-n-butylphosphonium bromide was used instead of the tetra-n-butylammonium bromide, whereby a curable composition was obtained.

The curing properties of the composition were substantially the same as those in Example 1 with $\Delta TR$ being 3.4 kg-cm and $t_{90}$ being 6.5 minutes, and the physical properties of the vulcanizate were also substantially equal.

EXAMPLE 3

The same operation as in Example 1 was conducted except that benzyltributylammonium chloride was used instead of the tetra-n-butylammonium bromide, whereby a curable composition was obtained.

The curing properties of the composition were substantially the same as those in Example 1 with $\Delta TR$ being 3.3 kg-cm and $t_{90}$ being 6.0 minutes, and the physical properties of the vulcanizate was also substantially equal.

EXAMPLE 4

The same operation as in Example 1 was conducted except that $\alpha,\alpha'$-bis-(t-butylperoxy)-p-diisopropyl benzene was used instead of the 2,5-dimethyl-2,5-di-(t-butylperoxy)hexane, whereby a curable composition was obtained.

The curing properties of the composition and the physical properties of the vulcanizate were substantially the same as those in Example 1.

EXAMPLE 5

A latex containing 12.7% by weight of a terpolymer comprising vinylidene fluoride/tetrafluoroethylene/propylene in a molar ratio of 39.6/36.4/24.0 was prepared in the same manner as in Example 1 except that the proportions of the comonomer charges were varied.

By using the latex thus obtained, unsaturated bonds were introduced into the copolymer by the same treatment as in Example 1.

A curable composition was prepared in the same manner as in Example 1 except that the treated copolymer thus obtained was employed.

The curing properties of the composition and the physical properties of the vulcanizate are shown in Table 1.

TABLE 1

|  | Example 1 | Example 5 | Comparative Example 3 |
|---|---|---|---|
| Curing properties |  |  |  |
| Effective torque $\Delta$ TR (kg-cm) | 3.4 | 3.2 | 3.8 |
| Optimum curing time $t_{90}$ (min) | 6.0 | 5.8 | 3.2 |
| Physical properties |  |  |  |
| Tensile breaking strength (kg/cm$^2$) | 183 | 167 | 130 |
| Breaking elongation (%) | 206 | 213 | 170 |
| Hardness (JIS A) | 74 | 73 | 72 |
| Permanent set (A) (%) | 23.3 | 26.2 | 40 |
| Low temperature (B) resistance (°C.) | −8.5 | −10 | −10 |
| Amine resistance (C) (%) | 18.8 | 32.8 | 58.9 |
| Oil resistance (D) (%) | 4.1 | 4.0 | 4.1 |

(A) Permanent set: 25% Compression, 200° C. × 70 hrs
(B) Low temperature resistance: TR-10 (ASTM D-1329)
(C) Amine resistance: Volume swelling rate when immersed in an aqueous solution of LLC (2 types selected from antifreezing liquids of JIS K-2234)/water = 1:1, at 180° C. for 70 hrs.
(D) Oil resistance: Volume swelling rate when immersed in an automobile engine oil at 150° C. for 7 days.

EXAMPLE 6

A latex containing 11.8% by weight of a terpolymer comprising vinylidene fluoride/tetrafluoroethylene/propylene in a molar ratio of 3.9/54.5/41.6 and having an intrinsic viscosity of 0.44 dl/g as measured in tetrahydrofuran, was prepared by emulsion polymerization.

By using 430 g of the latex obtained above, the same treatment as in Example 1 was conducted except that the concentration of the aqueous sodium hydroxide solution was changed to 20% and the amount of the tetra-n-butylammonium bromide was changed to 5 g. By using the treated copolymer thus obtained, a curable composition having the same composition as in Example 1 was obtained.

The composition had $\Delta TR$ of 2.2 kg-cm, thus indicating an improvement in the curing properties over the non-treated composition where $\Delta TR$ was 0.9 kg-cm. The tensile breaking strength and elongation of the vulcanizate were 120 kg/cm$^2$ and 220%, respectively, and the permanent set after the compression of 25% at 200° C. for 70 hours was 40%.

EXAMPLE 7

A latex containing 28.9% by weight of a bipolymer comprising vinylidene fluoride/perfluoro-(hexylvinyl ether) in a molar ratio of 80.7/19.3 and having an intrinsic viscosity of 1.75 dl/g as measured at 30° C. in a solvent mixture of trichlorotrifluoroethane/DMF (weight ratio of 9/1), was obtained by emulsion polymerization.

By using this latex, the same treatment as in Example 1 was conducted. Then, by using the treated copolymer thus obtained, a curable composition having the same composition as in Example 1 was obtained except that SRF-LS carbon was used instead of MT carbon. The composition had ΔTR of 2.5 kg-cm, thus indicating an improvement in the curing properties over the non-treated composition where ΔTR was 0.8 kg-cm. The tensile breaking strength and elongation of the vulcanizate were 127 kg/cm$^2$ and 170%, respectively, and the permanent set after the compression of 25% at 200° C. for 70 hours, was 23.6%.

The compositions of the present invention have remarkably improved curability and thus are useful as a starting material for vulcanized elastomers having excellent physical properties, and they also have industrial advantages that they can be produced by a simple process in good reproducibility.

Further, by virtue of various excellent physical properties of the vulcanizates, they are useful for a wide range of applications to e.g. automobile parts such as radiators or engine parts including O-rings, gaskets, sealing materials or tubes, food plant machinery such as heat exchanger gaskets or diaphragms, chemical plant machinery such as gaskets, sealing materials or hoses, or other sealing materials for automatic vending machines.

We claim:

1. A curable composition comprising an elastomeric vinylidene fluoride copolymer, an organic peroxide and an accelerator selected from the group consisting of polyallyl, divinyl, polybutadiene and methacrylate compounds, characterized in that said copolymer contains unsaturated bonds introduced by reacting at 50°–120° C. an untreated elastomeric vinylidene fluoride coplymer dispersed in an aqueous medium, with an aqueous alkaline solution containing an onium compound selected from the group consisting of quaternary ammonium and quarternary phosphonium compounds.

2. The composition according to claim 1, wherein the elastomeric vinylidene fluoride copolymer has a content of vinylidene fluoride units of from 2 to 90 mol %.

3. The composition according to claim 1, wherein the average particle size of the copolymer dispersed in the aqueous medium is at most 10 mm.

4. The composition according to claim 1, wherein the amount of the onium compound is at most 30 parts by weight per 100 parts by weight of the copolymer.

5. The composition according to claim 1, wherein the accelerator is selected from the group consisting of polyallyl compounds and 1,2-polybutadienes.

* * * * *